Sept. 21, 1971 C. P. MILLER ET AL 3,606,827
CONCRETE CURB LAYING MACHINE
Filed Nov. 7, 1968 6 Sheets-Sheet 1

INVENTORS
CHARLES P. MILLER
ALLEN R. MILLER
DAVID J. MILLER
By Harbaugh and Thomas
Attorneys Sept. 21, 1971    C. P. MILLER ET AL    3,606,827
CONCRETE CURB LAYING MACHINE Filed Nov. 7, 1968    6 Sheets-Sheet 2

INVENTORS
CHARLES P. MILLER
ALLEN R. MILLER
DAVID J. MILLER
By Harbaugh & Thomas
Attorneys Sept. 21, 1971  C. P. MILLER ET AL  3,606,827
CONCRETE CURB LAYING MACHINE
Filed Nov. 7, 1968  6 Sheets-Sheet 3

INVENTORS
CHARLES P. MILLER
ALLEN R. MILLER
DAVID J. MILLER

By Harbaugh and Thomas
Attorneys

INVENTORS
CHARLES P. MILLER
ALLEN R. MILLER
DAVID J. MILLER

By Harbaugh & Thomas
Attorneys

United States Patent Office 3,606,827
Patented Sept. 21, 1971

3,606,827
CONCRETE CURB LAYING MACHINE
Charles P. Miller and Allen R. Miller, McHenry, and David J. Miller, Ringwood, Ill., assignors to Miller Formless Co., Inc., McHenry, Ill.
Filed Nov. 7, 1968, Ser. No. 774,014
Int. Cl. E01c $19/48$
U.S. Cl. 94—46            20 Claims

ABSTRACT OF THE DISCLOSURE

A self-propelled, self-steering and self-leveling machine for laying concrete characterized by accurate, automatic or manual, adjustment and constant control of direction, grade and forward or reverse motion. In one embodiment the machine includes independently controlled front and rear propulsion saddle-mounted means on each side of the main frame, control means operating from a guide line adapted to provide integrated double-acting steering of opposite pairs of the propulsion means and a hydraulic system including a pair of double-acting rams on one side of the machine, one supporting the main frame directly upon each saddle mount, and a single double-acting ram connected to a walking beam supported at its ends on the other saddle mounts on the opposite side of the machine providing a three-point leveling in a five point suspension. In another embodiment the hydraulic system is characterized by electro-hydraulic means to individually power both sides of the machine to maintain constant curve radius and including automatic valve means to connect an auxiliary power source into the system to meet the higher demand of the outer propulsion means for shorter curve radii. Manual control over-ride and forward speed control are also provided as well as steering over-run compensation adapted to meet only the steering potential need of the system and steer by integrals rather than hunting. Means are provided to move the steering sensor in the direction of steer to reduce or eliminate hunting and oversteer. The propulsion means for delivery of the concrete to the mule is independent of the levelling and steering systems providing for extremely fine proportioning of forward speed and rate of feed of concrete to the mule.

BACKGROUND OF THE INVENTION

The older methods of road building employing individual motor scrapers, motor graders, rolling and compacting equipment have now been replaced by automatic machinery capable of simultaneously performing a number of functions. Some machines are capable of preparing the sub-grade with close profile control, scarifying, stabilizing the sub-grade and sub-base, trimming, spreading any required base, compacting and trimming the base, and the final step of laying the concrete through the use of attachments and auxiliary devices. These functions are carried out at speeds and with accuracies far exceeding the older methods. The previous methods used were not only tedious and slow, but the final product was often of poor quality and the grade level sometimes varied ± one inch between stations. Although, automatically controlled equipment is now capable of speeding up the road building process and also for providing closer tolerances both transversely and longitudinally of the finished road, there are still serious problems with these machines.

To illustrate, the electro-hydraulic systems used are subject to extreme conditions of wear and hard use, not only because of the adverse conditions imposed but because of the manner in which these systems are operated. The sensors following the string lines, to establish both grade level and direction, must hunt back and forth along the line to be actuated and in this manner the system and component parts are kept in constant oscillating operation. Secondly, although finite control is provided in these prior art machines the geometry of the carriage suspension is not such that complete advantage of the control capabilities is obtained; particularly with regard to steering control and grade adjustment. As a result, tolerances of one-eighth inch or more both transversely and longitudinally in profile control are common. These errors are not necessarily compensated for in the final paving operation because the paving machines use the same control and suspension systems. And perhaps even more important the prior art machines do not provide performance levels in either steering control or grade control which are above and beyond equilibrium states defined by the geometry, power and inherent performance criteria of the electro-hydraulic components used.

The instant invention has as one of its objects, the elimination of any and all of the foregoing problems in automatic grading and paving machinery. Other advantages and features of the invention will be described or become apparent as the description proceeds.

SUMMARY OF THE INVENTION

The present invention concerns, in one embodiment, automatic grading and paving machines wherein the machine automatically moves the traveling sensor perpendicular to the line of travel to provide integrated steering control as opposed to wavering or hunt control. The frame and material-handling parts of the machine of this invention are suspended from or upon three hydraulically-controlled points with the material-handling portion or outboard side riding on a two-point bogey suspension and the inboard side connected thereto by means of a walking beam on a one-point bogey suspension with propulsion means at each end. Provision is made for manual override for the steering system whereby sharp curves can be readily manipulated without distrubing the adjustment of parts or the form, level and curvature of the materials, such as concrete, being handled. A hydraulic control system for both steering and level control is provided to produce auxiliary power greater than peak demand in either direction over equilibrium conditions to compensate for and adjust to unusual leveling or steering conditions.

This invention also concerns certain improvements in the use of the string line guide system, the elimination of oversteer and understeer, the use of a two point suspension for the level control with a pair of single bogey mounts on the outboard side, and a three point suspension including a walking beam with a double bogey mount on the inboard side of the machine whereby the material-handling or outboard side of the machine corrects for about one-half of any elevation changes and the inboard side corrects for about one-quarter of the elevation changes. Although the invention will be described in relation to an automatic curb-forming machine it will become apparent that the invention can be applied to any type of material-handling machine.

THE PREFERRED EMBODIMENT

Referring to the drawings, particularly FIGS. 1, 2, 3 and 4, this invention is illustrated by the curb-forming machine 10 having the supply hopper 12 adapted to receive concrete 14 from the chute 16 of a concrete truck (not shown), convey the concrete upwardly through the screw conveyor 18, operated by the hydraulic motor 20 and deposit the concrete from the opening 22 into the feed hopper 24. The concrete is subjected to vibration to eliminate air bubbles in the feed hopper 24 by means of the electric vibrator 26 run by the motor 28.

These component parts comprising the concrete handling system are known in the art and represent a material handling system adapted to supply a continuous stream of material to a desired location. In this instance the feed hopper 24 has an open bottom communicating with the slip form or mule shoe 30 which is elongated and is affixed to the box frame member 32 (FIG. 3) by means of the adjustable vertical support members 33 and 34 in the rear and 36 and 38 (FIG. 1) in the front. The support members have suitable spaced holes 40 through which bolts are attached to hold the slip form at desired heights to the box frame member front and rear. The support members also serve to hold the feed hopper 24 as desired. Any arrangement to hold the material handling system to the box frame 32 and provide adjustability of the parts can be used. Thus, the elevation and length of the screw conveyor 18 can also be made adjustable to suit the size, capacity and configuration of the machine.

The slip form 30 is closed at the front end by the wall member 42 through which extend the tubes 44 having flared open ends to receive the reinforcing rods 46. The tubes 44 are spaced laterally from each other and also spaced above the bottom of the slip form. Any number of tubes 44 can be used with any desired spaced configuration. The longitudinal side brace 48 ties the slip form 30 to supports along the bottom edge. The rear end of the slip form 30 is open and the arrangement is so spaced above the grade level 50 (FIG. 2) to form or lay a continuous curb 52 containing the reinforcing rods 46 as the machine moves in the direction of the arrow 54. The slip form is contoured at the top 56 (FIG. 3) to lay any curb and gutter design to specifications including the so-called battered form illustrated and the other types: drive over, roll and vertical. The capacities of both the hoppers 12 and 24 are such that the machine can move continuously along the grade 50 and lay a continuous curbing with only intermittent interruptions for the laying of expansion points as may be required or adjustment of the concrete trucks, which move along with the machine as they discharge their load through the chutes as illustrated by the chute 16. The reinforcing rods 46 are placed in the tubes 44 by hand as the curbing progresses.

Figure 4:
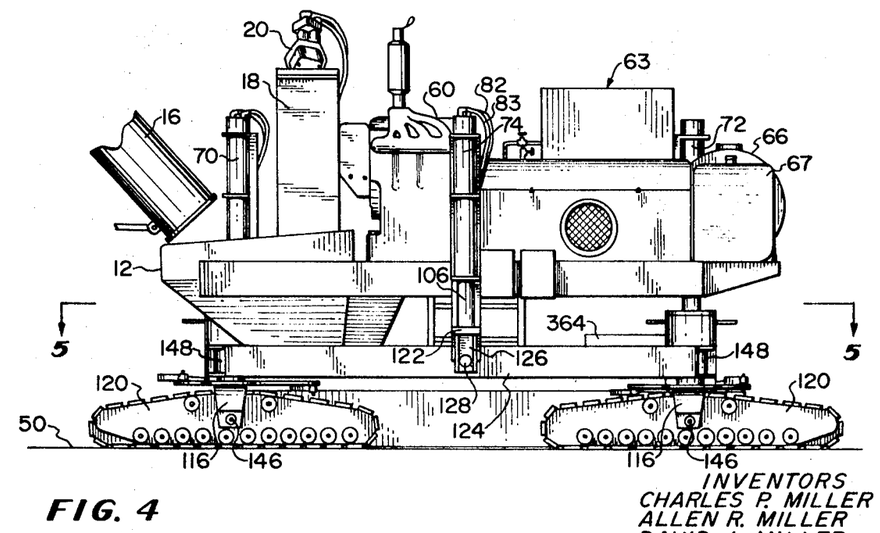
FIG. 4 is a side elevational view taken along the lines 4—4 of FIG. 3 to show the inboard side of the machine.

The machine is self-contained with the prime mover 60 supplying the power necessary to drive the hydraulic pumps and generators that are required. All functions of the machine can be controlled by one man from the platform 62 from which position the rate of discharge from the hopper 24 can be observed with the control console 63 in convenient access therewith. The top panel 64 of the console contains the controls and instruments for the prime mover 60 and the motive system, while the lower panel 65 contains the controls and instruments for the electro-hydraulic system. The water tank 66 supplies water as needed to clean off excess concrete on the parts so that it will not harden during idle periods of the machine. The fuel tank is illustrated at 67 (FIG. 4).

Basically the machine of this invention is a hydraulic-powered, self-steering and self-leveling curb-laying device wherein the motion, direction and grade are maintained by automatic or manual control and adjustment. The mechanical components to accomplish these are separately described.

The box frame 32 carries the forward outboard hydraulic cylinder housing 70 in a vertical position at one corner and the rearward outboard hydraulic cylinder 72 in a vertical position at the other corner, as two spaced adjustable suspension points for the slip form 30. Affixed to an intermediate position on the inboard side of the box frame 32 is a pair of hydraulic cylinder housings 74 and 76. Instead of a pair of cylinders at this suspension point a single cylinder can be used in the preferred embodiment. The cylinders are connected by means of hydraulic hoses to a source of hydraulic power to be described. Thus, the cylinder 70 has the pair of hoses 78 and 79; the cylinder 72 has the pair of hoses 80 and 81, the cylinder 74 has the pair of hoses 82 and 83 and the cylinder 76 has the pair of hoses 84 and 85. The flow of hydraulic fluid therein is reversible and controlled by a valve system to be described.

Figure 6:
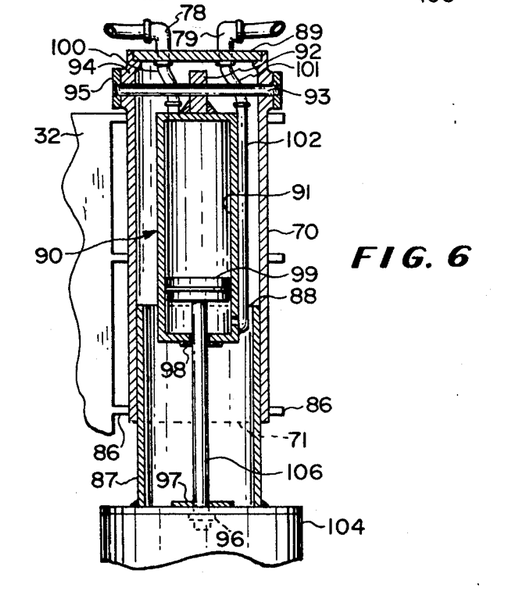
FIG. 6 is a cross-sectional view of one of the double-acting rams of the hydraulic leveling system.

The details of the construction of each of these hydraulic cylinders are shown in FIG. 6, a cross-section of the cylinder 70, wherein the box frame member 32 is provided with the spaced flange members 86 encompassing and affixed to the cylinder 70 to hold same in a fixed upright position.

The cylinder 70 has an open bottom 71 which encompasses the inner cylinder 87 having an open top 88 with its bottom affixed or welded to the base 104. The top of the cylinder 70 is closed by the plate 89, the parts defining a dust free enclosure for the cylinder head 90 having the inner cylinder bore 91. The cylinder head has the top central journal 92 affixed thereto and is supported by the clevis pin 93 which extends transversely through the journal and the bosses 94, where it is held at its ends by the lock nuts 95.

The base 104 supports the ram 106, through the heavy lock nut 96 and plate 97, upwardly through the cylinder 87 and through the packing gland 98 into the cylinder bore 91 where the piston 99 is affixed. The hose 78 connects through the plate 89 to the flexible coupling 100 which communicates with the top part of the bore 91, and the hose 79 connects to the flexible coupling 101 and to conduit 102 to the side of the cylinder head 90 below the normal operating level of the piston 99. By this arrangement the telescoping cylinders 70 and 87 provide lateral guidance and stability while the journal and clevis pin at the top and the plate and nut combination at the bottom provide slight axial resilience and alignment for the cylinder head and piston combination during reciprocation and leveling at each suspension point.

Annular oil rings (not shown) to seal the periphery of the piston 90 in sliding leak-proof relationship within the bore 91 would normally be provided. The ram and piston are shown in the normal operating position within the cylinder head 108, between the outlets of the couplings 100 and the conduit 102 and in this instance in a raised position. The flow of hydraulic oil through the hoses is reversible whereby the box frame 32 is raised or lowered upon the ram 106.

Figure 5:
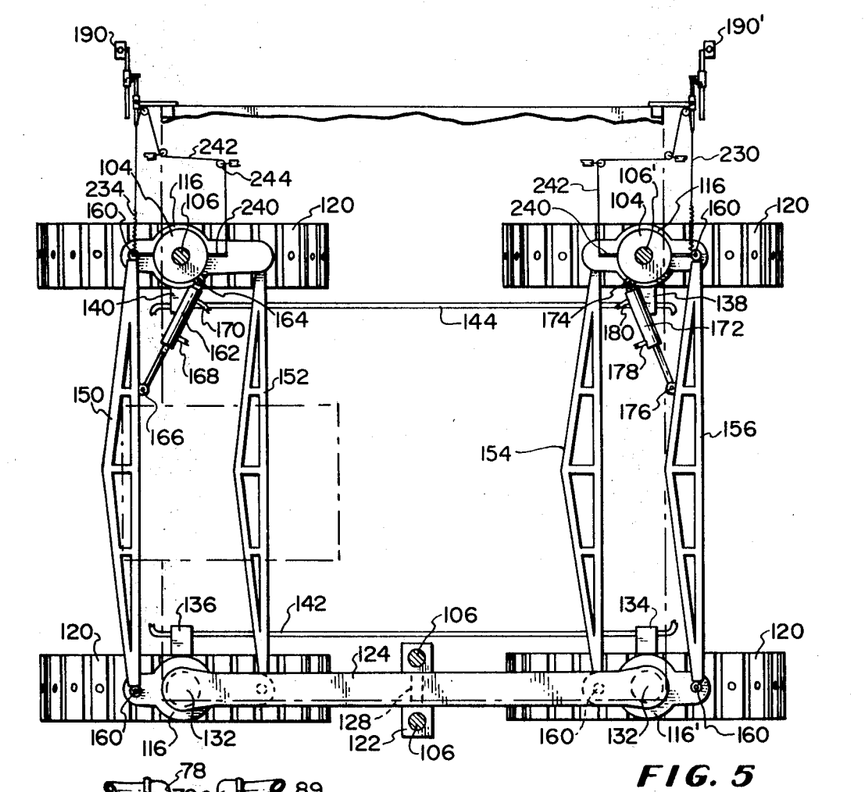
FIG. 5 is a cross-sectional view taken along the lines 5—5 of FIG. 4 to show the bogey suspension, steering linkages and sensor guidance systems.

Referring to FIG. 5, it is seen that the rams 106 and 106' on the outboard side of the machine and their respective bases 104 are affixed to the bogey mountings or saddles 116, the former being the forward suspension unit and the latter being the rearward suspension unit for the crawler type tractor units 120.

On the inboard side (see FIGS. 4 and 5) the pair of the rams 106 are mounted to a rectangular base 122 intermediate the ends of the walking beam 124 by means of the angle braces 126, on each side, or straddling this beam and the pivot pin 128, which extends through the braces and the beam, forming a central bogey or saddle mount. Also on the inboard side and at each end of the walking beam are attached the pair of inboard crawlers 120 on their respective bogey mounts 116. The arrangement of the tractor units 120 on the outboard side and the inboard tractor units 120 in relation to the box frame 32 is essentially rectilinear, as shown in FIG. 5. The wheel base and distance between the tractors across the machine can be varied to accommodate different sizes and weights of machinery. The bogey mountings on all four tractors pivot on a vertical axis. This axis is coincident with the rams 106 on the inboard side and located at each end of the walking beam 124 on the outboard side and represented by the pintle pins 132 (see FIG. 5).

The tractors each have individual hydraulic drive motors, i.e., the motor 134 (FIGS. 3 and 5) and 136 for the inboard side and the motors 138 and 140 for the outboard side. These are two-way or reversible hydraulic motors such as Charlyn Orbit motors. The motors on each side are connected in series to each other by the hydraulic hose lines 142 and 144.

Figure 1:
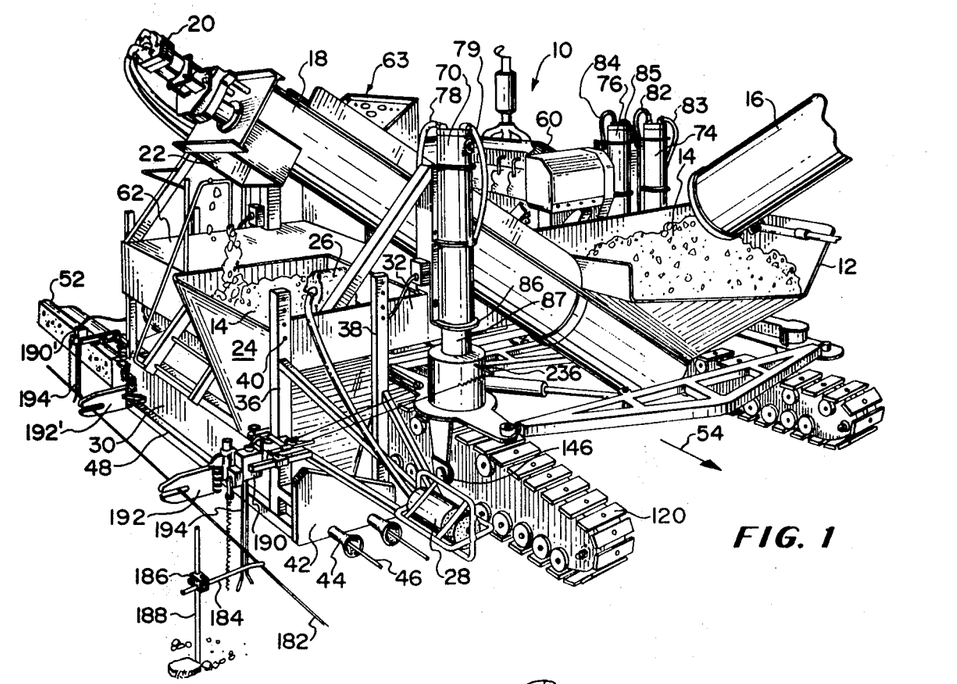
FIG. 1 is a perspective view showing the front and outboard or curb side of the machine of this invention.
Figure 3:
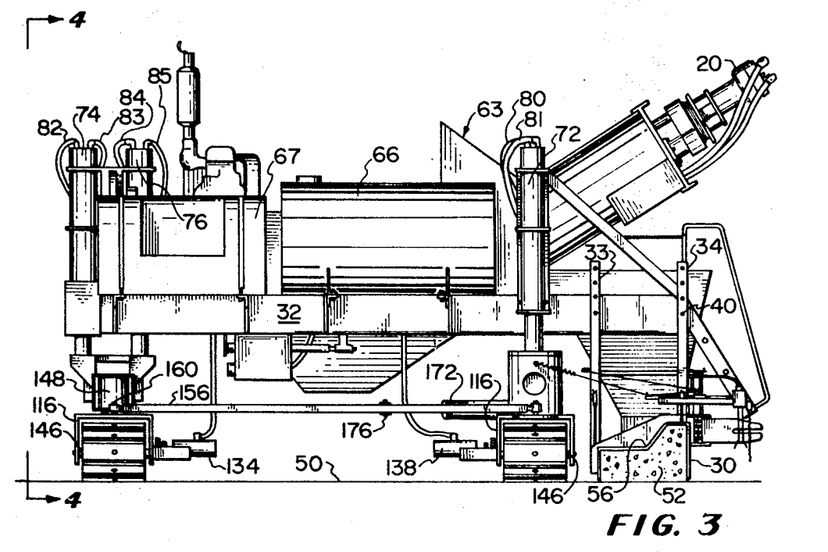
FIG. 3 is an end elevational view partly in cross-section taken along the lines 3—3 of FIG. 2.

Each bogey mount 116 is attached to its respective crawler 120 by means of a cross pin 146 (FIGS. 1, 3 and 4). In this manner the crawlers can negotiate obstacles such as unevennesses in the grade 50 and stones that may be in the path of travel. Also each bogey mount 116 is pivoted on a vertical axis with the respective journals 148 within or as part of the base members 104. The front pair of crawlers (FIG. 5) is tied together, fore and aft of the cross pins 146, by means of the paired tie bars 150 and 152. Similarly the rear pair of crawlers is tied together by the tie bars 154 and 156. Each tie bar is constructed as an A-frame for rigidity and is mounted to the bogey mounts 116 by the pivot pins 160. By this arrangement the two fore and aft crawlers turn in a horizontal plane in unison. Steering of the front pair of crawler tractors 120 is controlled by the double-acting hydraulic steering unit 162 acting between the pivot pin 164 on the outboard base 104 and the pivot pin 166 on the tie bar 150. The hydraulic control hoses for the steering unit 162 are indicated at 168 and 170. Similarly steering for the rear pair of crawler units 120 is provided by the hydraulic steering unit 172 through the pivot pin 174 on the base 104 and the pivot 176 on the bar 156. The hydraulic control hoses 178 and 180 supply the necessary hydraulic fluid to this steering unit.

From the description thus far, it is seen that five bogey mounts are included in the bogey frame and suspension, two being on the out-board side and three on the inboard side with means to control the level, direction and horizontal motion of the system. The machine travels on the established and prepared grade 50 under the guidance of the string line 182 (FIGS. 1, 7 and 8) which is supported from the horizontal arms 184 mounted on the adjustable brackets 186 from the string line posts 188. The brackets 186 are adapted to be adjustable in height upon the posts 188 and also to vary the effective length of the horizontal arms 184. The string line 182 is placed outside of the edge of the grade 50 at any predetermined elevation above the grade and held by a plurality of spaced arms 184 therealong in a manner known in the art. The string line 182 is taut so as to represent the desired level and direction of the curbing 52 to be laid along and upon the edge of the grade 50.

The machine is accurately guided along the string line 182 by means to detect the direction of the line and by means to detect the elevation of the line. The former variable is detected by the steering sensor 190, for the forward crawlers, and the steering sensor 190' for the rear crawlers. The latter variable is detected by the elevation sensors 192 and 192' which are mounted for passage along the string line directly behind and directly ahead of the steering sensors respectively. The steering sensors each have a vertical fork 194, the tines of which straddle the string line 182, while the elevation sensors have the horizontal forks 196 within the bifurcated housing, as indicated (FIG. 8) and also straddling the string line.

Figures 7, 8, 9:
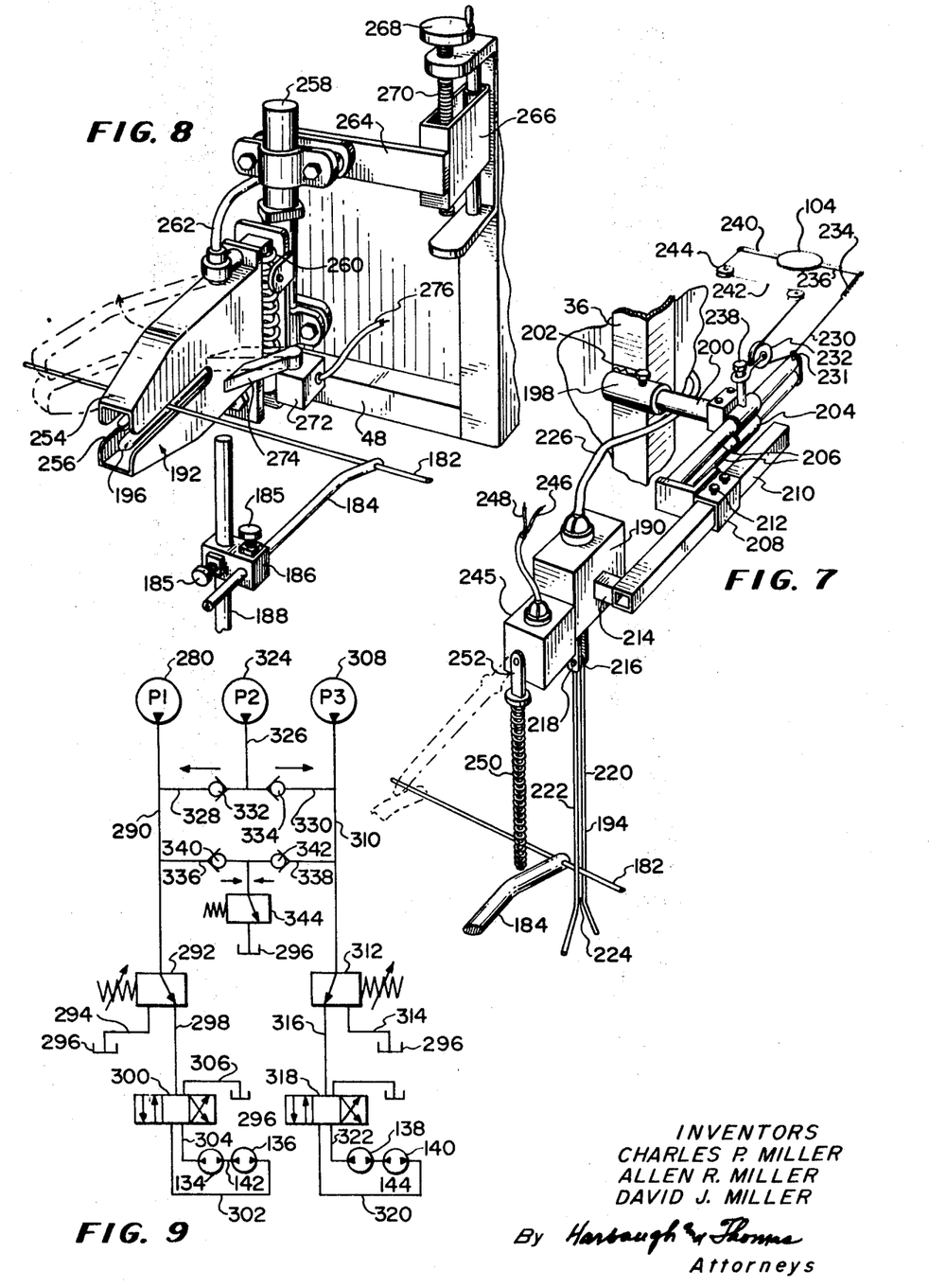
FIG. 7 is a fragmentary view of the steering sensor control and automatic shut-off.
FIG. 8 is a fragmentary side elevational view showing one of elevation sensors and automatic shut-off.
FIG. 9 is a schematic diagram of the hydraulic system and controls for the traction system of the machine of this invention.

The details of the mounting means for the steering sensors 190 and 190' are shown in FIG. 7 wherein the tubular housing 198 is affixed to the upright frame member 36. The rod 200 is slidably mounted in the housing 198 and fore and aft adjustment as well as angular adjustment is provided by the set bolt 202. At the end of the rod 200 there is provided the tubular housing 204 in which the rod 206 is slidably mounted. The outer end of the rod 206 carries the fixed bracket 208 having a square bore to receive the support bar 210. The set bolts 212 in the bracket 208 hold the bar 210 at the desired horizontal placement. The steering sensor 190 is affixed to the end of the bar 210 by means of the rigid arm 214 extending outwardly therefrom.

In order that the vertical fork 194 can pass over the horizontal arms 184 it is mounted from the yoke 216 by means of the cross pin 218. The tines 220 and 222 of the fork 194 are parallel and have a space 224 therebetween which is slightly wider than the diameter of the string line 182. The electrical connection of the sensor 190 is indicated at 226.

Means to move the steering sensor normal to the direction of steer are provided to include the cable 230, affixed at 231 to the inner end of the reciprocable rod 206, which is affixed to the spring 234 carried by the radial bracket rod 236 extending forwardly from the base 104 of the forward outboard bogey mount. The sheave 232 is mounted to the pin 238 carried by the housing 204. A rearward radial bracket rod 240 (see also FIG. 5) is provided with the cable 242 affixed thereto and extending over the pair of sheaves 244 to an in-line position with the sheave 232 where it reverses and is attached or otherwise affixed to the rod 206 as at point 231. Since the rods 236 and 240 turn on a vertical axis with the crawler during steering adjustments as sensed by the steering sensor 190, the cables 230 and 242 move back and forth carrying the sensor 190 back and forth in the same direction, or, outwardly perpendicular to the line of travel when the crawler turns to the left and inwardly perpendicular to the line of travel when the crawler turns to the right. Thus, as the fork 194 follows the string line it is moved in a direction the same as the steering direction and perpendicular to the line of travel an amount proportioned by the ratio of the length of the radial brackets to the effective change in direction imparted to the crawlers, or an increment of that length.

Balance of the steering sensor 190 is provided by the double rod 206 and double bracket 204 as shown to prevent the fork 220 from rotating out of perpendicular. The rod 206 is lubricated and is free to reciprocate in the housing 204. A spline fitting or the equivalent can be used between the housing 204 and the rod 206 as desired.

As the machine follows the string line 182, the fork 194 momentarily strikes, is raised by, and passes over the horizontal supports 184 which are spaced along the string line. The limit switch 245, normally closed, with the electrical connections 246 and 248 is provided on each of the steering sensors 190, with the sensing spring 250 and the pendant arm 252, extending into operable relationship with the horizontal supports. The sensing spring 250 on striking a support 184 momentarily opens the switch 245 and breaks the circuit to the steering system.

The known manner of mounting the elevation sensors 192 and 192' is illustrated in FIG. 8 wherein the housing 254, having the slot 256 is hinged at the inner end by the pin 258 and urged or held resiliently at an angle of about 90° from the frame 48 by the spring 260. The electrical connector 262 is flexible and connects the sensor 192 through the actuator fork 196 to the electrical system. The pin 258 is supported by the bracket 264 from the follower 266 which can be raised or lowered by means of the hand wheel 268 driving the worm gear 270 therethrough. A limit switch 272, normally closed, is mounted from the frame 48 with the actuator arm 274 biased against the side of the housing 254. An electrical connection 276 between the limit switch and the circuit of the machine is provided. When the housing 254 strikes the horizontal support 184 for the string line 182, which is too large to pass through the slot 256, the elevation sensor 192 is moved about the pivot 258 in the manner shown by the dotted lines. This momentarily disconnects the sensor from the circuit by the movement of the actuator arm 274 under the bias of the internal spring in the limit switch 272. After the elevation sensor passes the arm 184 it returns to its normal position in registry with the string line 182.

Although a single source of hydraulic power is used for the levelling and steering control system of this invention, as will be described in connection with FIG. 10, it has been found that separate pumps are necessary for the traction system. In addition, adequate control of the two pairs of hydraulic motors was not possible until the system shown in FIG. 9 was used.

In this embodiment the pump 280 connects through the line 290 through the main flow electrically-controlled valve 292 which in the "off" position connects through the line 294 to the sump return 296 back to the pump and in "on" position connects through the line 298 to the four-position solenoid-operated valve 300, shown in ASA symbols. The hydraulic motors 134 and 136 are connected through the line 142 to the valve by means of the lines 302 and 304 with the return to the sump system represented by the line 306.

A similar system is provided connecting the pump 308 with the line 310, the main valve 312, having the return line 314, and the line 316 connected to the four-positioned solenoid valve 318 controlling the flow of hydraulic oil through the line 320, through the motors 138 and 140 and the connecting line 144 by means of the line 322. This part of the system is also connected to the sump return.

In operating a machine of this size and weight with accurate control it was found that additional motive power was necessary to augment the pumps 280 and 308 in order to adequately provide positive additional speed of travel of one side or the other of the machine to properly negotiate turns and maintain equilibrium control of the motive means at all times. Experience indicated that this was true of the front of the machine where the curbing to be laid had a sharper than usual curvature. This additional integrated power and speed is provided by the pump 324 which is used to cause the curve line of the tractors to take a path intermediate between the normal path and the actual curb line. By these means the machine is caused to pivot about its geometric center between the four tractors and over-steer sufficiently to lay the curb along the line called for by the guide line 182.

As shown in FIG. 9, the pump 324 is connected by means of the line 326 to the connecting or branch lines 328 and 330, having the check valves 332 and 334, allowing flow only in the direction of the respective arrows. The branch lines 328 and 330 connect to the lines 290 and 310, respectively. To protect the system and provide positive control the branch lines 336 and 338 are connected through their respective check valves 340 and 342 to the flow control valve 344 and to the sump 296. The permitted flow direction through the check valves 340 and 342 is opposite that of the branch lines 328 and 330, as indicated by the arrows.

The operation of the hydraulic system of FIG. 9 is as follows. Under normal conditions the pumps 280 and 308 supply the required hydraulic power for the motion of the machine through the tractor motors 134 and 136 and 138 and 140, with the valves 292 and 312 open and with both valves 300 and 318 set for forward direction. Where additional power to one or both pairs of tractors is required, the pump 324 is cut in and the excess hydraulic pressure is delivered to either line 290 or 310 to increase the speed of operation of the desired outboard or inboard tractors to augment the steering system.

Figure 10:
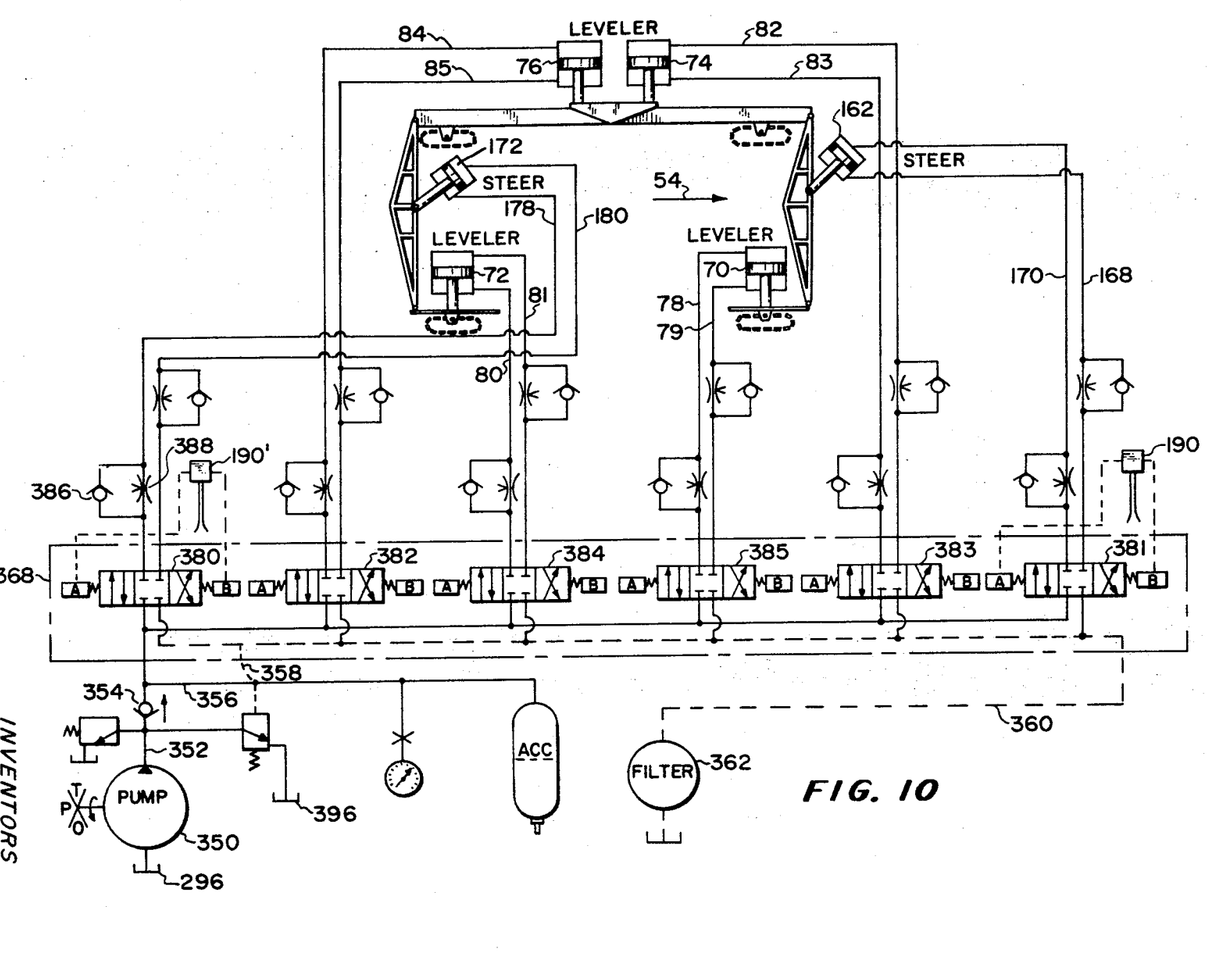
FIG. 10 is a schematic diagram of the hydraulic systems and controls for the elevation and steering systems of the machine of this invention.

FIG. 10 is a diagrammatic illustration of the hydraulic system for the steering and levelling control of the machine wherein like numerals appear for parts already described. The main pump 350 is connected to the line 352, controlled by the check valve 354, and to the sump return 296 in a manner known in the art. The line 352 is manifolded as indicated by the broken lines to connect to the lines 178 and 180 of the rear steering unit 172; the lines 168 and 170 of the front steering unit 162; the lines 78 and 79 of the front leveler ram 70 and the lines 80 and 81 of the rear leveler ram 72, considering that the machine is moving in the direction of the arrow 54. Included in the manifold system from the hydraulic source 352 are the lines 82 and 83 for the leveler 74 and the lines 84 and 85 for the leveler 76 which operate in unison to maintain inboard side of the machine at a constant level with the outboard side.

Flow of hydraulic fluid through the manifold is in both directions and return to the sump 296 can be either through the line 356, the line 358 or the line 360 through the filter 362. Safety relief valves, an accumulator and pressure gauges, are connected to the system in a known manner. A fan cooled radiator 364 (FIG. 4) can also be included to control the temperature of the hydraulic oil. The flow control valves for the system shown in FIG. 9 are indicated at 366 in FIG. 2.

Figure 2:
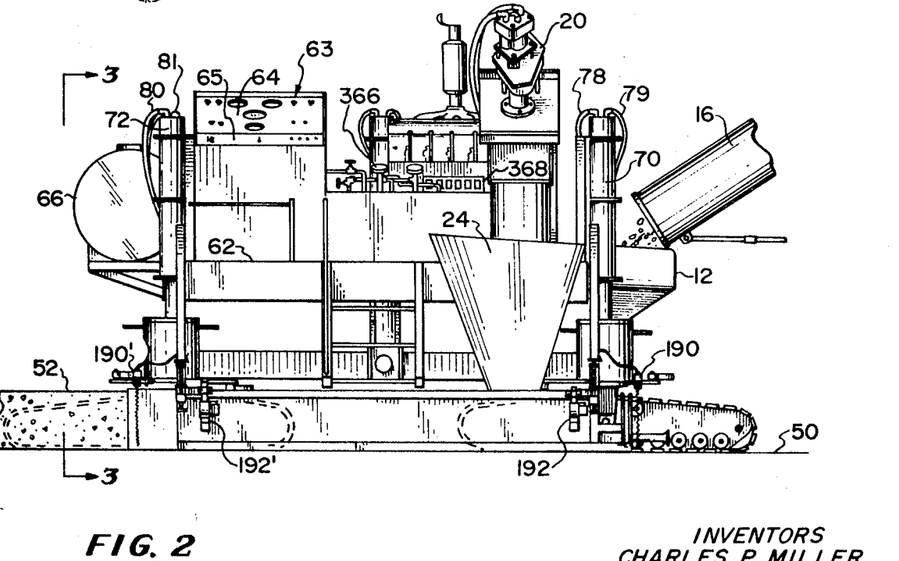
FIG. 2 is a side elevational view of the machine illustrated in FIG. 1 showing the outboard or curb side.

The manifold generally indicated at 368 in FIG. 2 includes the series of six double solenoid valves; 380 and 381 (FIG. 10) for rear and front steering control, valves 382 and 383 for inboard level control and 384 and 385 for outboard level control. Between each solenoid valve and the respective hydraulic part, controlled thereby, is a check valve and a flow control and shut-off valve as indicated at 386 and 388 respectively, in the rear steering system. The respective solenoids of the valves 380–385 are indicated at A and B using the ASA symbols.

Figure 11:
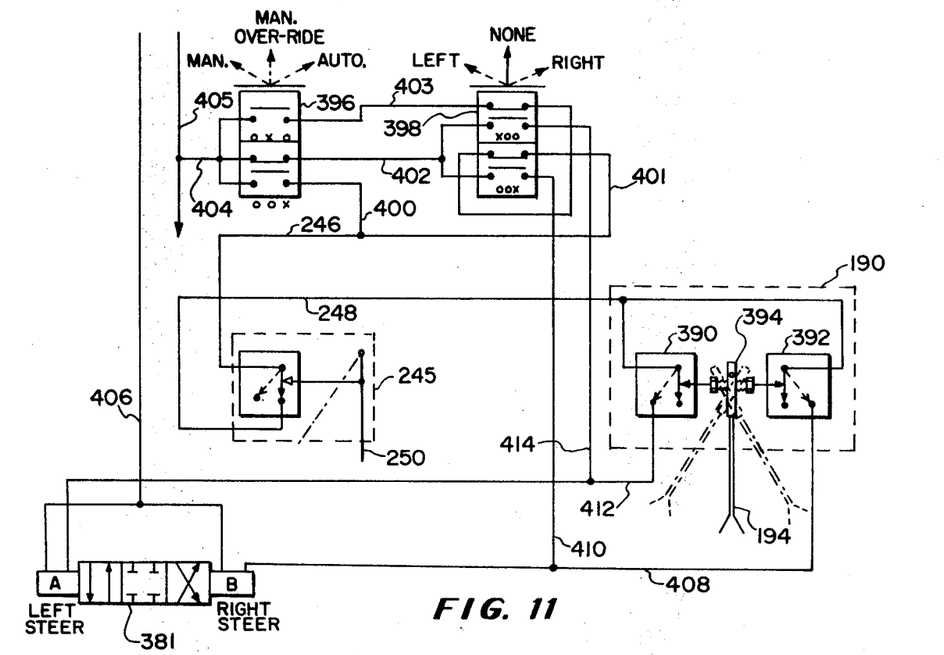
FIG. 11 is a schematic diagram showing more details of the steering control system.

FIG. 11 shows in greater detail the parts of the electrical circuit connecting the steering sensor 190 with the control console and the front steering solenoid valve 381. The same type of circuitry is used for the rear steering sensor 190' and the rear steering solenoid valve 380. The pick-up fork 194 is pivotally mounted to be swung a few degrees left or right (shown in exaggerated form by the dotted lines) by the guide line and thereby actuate either the switch 390 or the switch 392, both of which are normally open. If the fork 194 does not move, both switches 390 and 392 remain open. An adjustable mounting 394 is provided for finite adjustment of the zero lash in the switch suspension. Both switches are connected to the common lead 248 (see also FIG. 7) through the limit switch 244 and through the lead 246 to the manual override switch 396 and the manual steering switch 398, through the leads 400 and 401 and through either of the leads 402 or 403 or 404 to the hot line 405. The common ground line 406 connects through both solenoids A and B of the valve 381 back to the switch 392 by way of the lead 408, back to the manual steering switch 398 by way of the lead 410 and back to the switch 390 by lead 412 and to the manual steer switch 398 by means of the lead 414. The steering sensor 190 and the limit switch 245 are remote from the valve 381, located in the hydraulic system and the switches 396 and 398, are located on the console 63. The lines 408 and 412 are within the conduit 226 and the lines 246 and 248 may be in a separate protective conduit.

Figure 12:
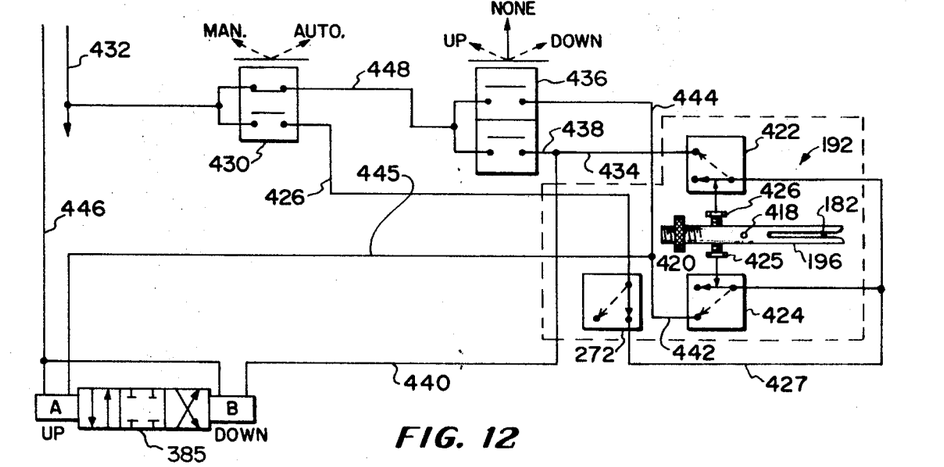
FIG. 12 is a schematic diagram of the elevation control system of this invention.

In FIG. 12 there is shown diagrammatically the electrical circuit for the elevation pick-up members 192, a duplicate of the circuit shown being used for the front and rear levelers 70 and 72 and the inboard levelers 74 and 76. The fork member 196 is mounted on the pivot 418 and counter-balanced by the weight 420 which engages the threaded shank of the fork member. A pair of micro-switches 422 and 424 are in operable relationship with the fork member 196 by means of their respective adjustable contact arms 425 and 426. The switches 422 and 424 are normally open and are triggered to closed position by the slightest upward or downward movement of the fork 196 as it follows the guide line 182.

Both the switches 422 and 424 are connected by means of the common lead 427 to the limit switch 272 (see FIG. 8) through the 2-mode selector switch 430 to the hot line 432. The other terminal 434 of the switch 422 connects to the manual elevate switch 436, through the lead 438 and the lead 440 to the solenoid B of the valve 385 for the front leveler 70. The other terminal of the switch 424 connects through the lead 442 to the manual elevate switch 436 by means of the branch lead 444 and through the second branch lead 445 to the solenoid A of the valve 385. The ground line 446 connects to the coils of the solenoids A and B in a manner known in the art. The manual elevate switch 436 is connected to the selector switch 430 by means of the lead 448. The switches 430 and 436 are located in the console 64. The same circuit is used for the rear elevator 194 and the valve 384 controlling the leveler 72, and also the inboard levelers 74 and 76 through the solenoid valves 32 and 383. In order to simplify the circuit shown in FIG. 10 only the steering sensors 190 and 190' are shown in their respective diagrammatic relationship with these parts, it being understood that the elevation sensors can be similarly shown in this overall relationship.

It is apparent that ordinary wheels can be used in place of the crawler tractor units 120. The lines 336 and 338 in FIG. 9 do not need to have a common connection to the valve 344, but this common connection eliminates the use of another valve 344.

The length of the steering sensor control rods 236 and 240 for both front and rear outboard tractors (see FIG. 5) was arrived at by several experiments. It was found that although the length of the rods 236 and 240 can bear any desired ratio to the geometry of the apparatus, the most accurate steering control was obtained when the ratio of the length of the crawler tractor to the length of the rod was between about 3:1 to 4:1 and preferably about 3.6:1. That is to say, by way of illustration with a crawler tractor 120 that is six feet long overall, and pivoted at its mid-length, the rod 236 was best set at 10 inches in length for the 3 feet of tractor ahead of the pivot point or at a ratio of 3 feet to 10 inches or 3.6:1. The same considerations apply to the rods 236 and 240 which control the rear outboard tractor unit 120. As observed in FIG. 5 the geometry of the cables 230 and 242 in relation to the steering control rods is reversed over that of the front unit. The sensitivity of control is increased by increasing the length of the rods 236 and 240 in relation to the wheel means or tractor units used and for some operations at 1:1 ratio may be desired.

The clearance 224 of the tines 220 and 222 of the sensing arm 194 is about ⅛ inch (0.125) and the diameter of the string line is about the same when in the unstretched condition. Once the string line is tautened it reduces in diameter sufficiently to give a clearance on each side, between the tines, of about 0.010 inch.

The accuracy of the finished curb or surface laid by the device of this invention is not limited to preparation of a smooth preformed surface. During actual tests attempts were made to cause discrepancies in the end product 52 by throwing rocks, bricks, and even compactible material in the path of one or the other of the tractor units. It was found that the machine leveled itself instantaneously and the conformation, level and direction of the product 52 was not disturbed.

Some differences in the sensitivity can be brought about by making other changes in the device of this invention. Thus, the most efficient leveling was found to occur with the front and rear elevation sensors 192 located about opposite the levelers 70 and 72 on the outboard side although good level control is had with the sensors at any point ahead of and behind the pivot point 128 of the walking beam 124. Placement of the elevation sensors 192 too far ahead or behind the unit disrupts the relationship between the string line and the immediate product being laid on the surface 50.

Similarly, some latitude is applied in the placement of the first and rear steering sensors. Best results are obtained with the front steering sensor 190 at or near the pivot point of the front wheel means and with the rear steering sensor at or near the discharge end of the slip form. The key to these placements is the pivot point 128 of the walking beam, i.e., the sensors, whether elevator or steering are placed fore and aft of the intersecting line drawn through this pivot point normal to the line of travel when the steering units are at their midpoint. All tolerances can be kept within 0.01 inch and within the private and public specifications for road, curb, sidewalk or other construction work. The transverse leveling of the device is initially established by the use of a spirit level and manual control. Instead of this a transverse slope control of valves 382 and 383 in unison using known instrumentation can be used. The use of a pendulum for transverse level control proved to be inaccurate and gave too much hunt. Once the transverse line is established the operator need only check this adjustment at intervals during the operation.

From this description it is apparent that the improvements of this invention can be applied to any type of material handling device adapted to move along a guide line or string line on a preformed surface and deposit a layer of flowable semi-solid or formable material from a supply onto the surface. The resulting layer will have its top surface and sides in a level and direction relationship conforming to and controlled by the guide line, regardless of imperfections in the preformed surface being treated.

Although hydraulic controls are used to illustrate one aspect of the invention it is apparent that the invention as it relates to the steering control and leveling control can apply to electrically operated machines. The three-point suspension, that is, the triangular relationship of the outboard rams with the inboard ram, on the walking beam, can be any triangular configuration which accomplishes the unexpected leveling results found herein. This triangular relationship, considering the relative lengths between the fore and aft rams on the outboard side and the beam width of the frame can form an equilateral triangle, an isosceles triangle or a right triangle wherein any of the points thereof can represent the suspension points of the device. Preferably, an equilateral arrangement is used from the standpoint of stability and finite control of leveling. The slip form or other means to deposit the formable material can be at any location on the frame. Any wheel means can be used and the crawler tractor units are merely illustrative. Portland type or bituminous types of material can be readily handled with the device of this invention. Asphalt, gravel or the like material can be handled as well as concrete for road or sidewalk building. In applying the machine to curb-laying or road building some attention must be paid to the consistency of the concrete so that it will adapt itself to slip-form operations as is known in the art.

Any type of four-way solenoid valves can be used, that is those having closed, open and reversing positions to control two-way hydraulic flow, as illustrated by the RIVETT Type O valve operating on 12 volts D.C. The manifold assembly 368 is an assembled unit with a MacMillan circuit block as illustrative of a compact, serviceable design.

What is claimed is:

1. A material handling device adapted to move along a guide line over a surface and deposit a layer of flowable material from a supply onto said surface with the top surface and sides of said layer being in a level and direction relationship conforming to and controlled by said guide line comprising:
   outboard and inboard sides on said device, said outboard side normally being along said guide line;
   pivotally mounted front and rear wheel means supporting said device on the inboard and outboard sides and adapted to travel over said surface, the front and rear wheel means on the inboard side being mounted fore and aft, respectively, to a walking beam;
   means to individually drive each of said wheel means on the same side of said device at the same rotational speed whereby to move said device over said surface adjacent to said guide line;
   means to individually raise and lower said device in relation to each of said wheel means on the outboard side;
   means to raise and lower said device on said inboard side in relation to a point intermediate the ends of the walking beam;
   means to steer the front inboard and outboard wheel means on their respective pivot points in unison and the rear inboard and outboard wheel means on their respective pivot points in unison;
   form means supported by said device and adapted to discharge said material from said supply in a layer on said surface;
   means following and sensitive to the direction of said guide line;
   means following and sensitive to the elevation of said guide line;
   means responsive to said direction sensitive means to actuate said steering means and steer said device along said guide line;
   means responsive to said elevation sensitive means to actuate said raising and lowering means to change the elevation of said device in accordance with differences in the elevation of said surface and said guide line;
   and means to move said steering sensing means in relation to said device in the same direction and in a linear increment of a steering correction.

2. A material handling device in accordance with claim 1 in which said means following and sensitive to the direction of said guide line are supported on the outboard side of said device at points fore and aft said intermediate point of said walking beam.

3. A material handling device in accordance with claim 1 in which said means following and sensitive to the elevation of said guide line are supported on the side of said device fore and aft said intermediate point of said walking beam.

4. A material handling device in accordance with claim 1 in which:
   a pair of said means following and sensitive to the direction of said guide line is provided; and
   one of said following and direction sensitive means being positioned ahead of the pivot point of said outboard front wheel means and the other being positioned aft the pivot point of said outboard rear wheel means.

5. A material handling device in accordance with claim 4 in which:
   said form means has its discharge end aft of said device; and
   said rear direction sensitive means is adjacent said discharge end.

6. A material handling device in accordance with claim 1 in which:
   a bogey mounting is provided between each of said outboard wheel means and said device; and
   a bogey mount is provided between each of said inboard wheel means and the ends of said walking beam.

7. A material handling device adapted to move along a guide line over a surface and deposit a layer of flowable material from a supply onto said surface with the top surface and sides of said layer being in a level and direction relationship conforming to and controlled by said guide line comprising:
   outboard and inboard sides on said device, said outboard side normally being along said guide line;
   pivotally mounted front and rear wheel means supporting said device on the inboard and outboard sides and adapted to travel over said surface, the front and rear wheel means on the inboard side being mounted fore and aft, respectively to a walking beam;
   means to individually drive each of said wheel means on the same side of said device at the same rotational speed whereby to move said device over said surface adjacent to said guide line including:
      a first drive means for said outboard wheel means;
      means to control the output and direction of said first drive means;
      a second drive means for said inboard wheel means;
      means to control the output and direction of said second drive means; and
      third drive means adapted selectively to supplement the power to said first and second drive means;
   means to individually raise and lower said device in relation to each of said wheel means on the outboard side;
   means to raise and lower said device on said inboard side in relation to a point intermediate the ends of the walking beam;
   means to steer the front inboard and outboard wheel means on their respective pivot points in unison and the rear inboard and outboard wheel means on their respective pivot points in unison;
   form means supported by said device and adapted to discharge said material from said supply in a layer on said surface;
   means following and sensitive to the direction of said guide line;
   means following and sensitive to the elevation of said guide line;
   means responsive to said direction sensitive means to actuate said steering means and steer said device along said guide line;
   means responsive to said elevation sensitive means to actuate said raising and lowering means to change the elevation of said device in accordance with differences in the elevation of said surface and said guide line;
   and means to move said steering sensing means in relation to said device in the same direction and a linear increment of a steering correction.

8. A material handling device in accordance with claim 1 in which:
   said device is mounted to said wheel means by means of upstanding hydraulic means having cylinder ends and piston rod ends;
   an outer telescoping casing about said hydraulic means;
   pin means pivotally mounting said hydraulic means at one of said ends on a transverse axis in said casing;
   a source of hydraulic power for said rams;

solenoid controlled valves between said source and said hydraulic rams; and said elevation detection means are connected to control said valves.

9. A material handling device adapted to move along a guide line over a surface and deposit a layer of flowable material from a supply onto said surface with the top surface and sides of said layer being in a level and direction relationship conforming to and controlled by said guide line comprising:

outboard and inboard sides on said device, said outboard side normally being along said guide line;

pivotally mounted front and rear wheel means supporting said device on the inboard and outboard sides and adapted to travel over said surface, the front and rear wheel means on the inboard side being mounted fore and aft, respectively to a walking beam;

means to individually drive each of said wheel means on the same side of said device at the same rotational speed whereby to move said device over said surface adjacent to said guide line;

means to individually raise and lower said device in relation to each of said wheel means on the outboard side;

means to raise and lower said device on said inboard side in relation to a point intermediate the ends of the walking beam;

means to steer the front inboard and outboard wheel means on their respective pivot points in unison and the rear inboard and outboard wheel means on their respective pivot points in unison;

form means supported by said device and adapted to discharge said material from said supply in a layer on said surface;

means following and sensitive to the direction of said guide line comprising a double contact switch;

a pivotally mounted pendent fork member adapted to straddle said guide line, the axis of said pivot being above and normal to the axis of said guide line;

the upper end of said fork member above said pivot being adapted to make one contact in one position and another contact in the other position;

means to finitely adjust the travel distance of said upper end of said fork member between said contact points;

means following and sensitive to the elevation of said guide line;

means responsive to said direction sensitive means to actuate said steering means and steer said device along said guide line;

means responsive to said elevation sensitive means to actuate said raising and lowering means to change the elevation of said device in accordance with differences in the elevation of said surface and said guide line;

and means to move said fork member in relation to said device in the same direction and a linear increment of a steering correction.

10. A material handling device in accordance with claim 9 in which:

said fork member has a second pivot between said pendent axis and said guide line whereby to allow said fork member to pass over support members for said guide line; and a limit switch to deactivate said double contact switch during passage of said fork member over support members along said guide line.

11. A material handling device in accordance with claim 9 including:

a mounting for said double contact switch adapted to reciprocate on an axis perpendicular to the axis of said guide line;

means connecting said mounting to a point radially forward and radially rearward of the pivot point of said wheel means whereby the steering of said wheel means moves said double contact switch in either direction of steer an amount substantially equal to the correction.

12. A material handling device in accordance with claim 11 in which:

said mounting for said double contact switch comprises an elongated member, a housing member to reciprocably hold said elongated member on a substantially horizontal axis, a radial member extending forward of the front wheel means and turned therewith, a radial member extending rearward of said front wheel means and turned therewith, a link member between the end of said forward radial member and the inner end of said elongated member whereby said switch is moved in the direction of steer, and a link between the rear radial member and said elongated member, said link being pivoted outboard of said point of attachment to said elongated member whereby said elongated member is moved in the direction of steer of said wheel means.

13. A material handling device in accordance with claim 12 in which:

the ratio of the length of said radial members connecting said elongated member are sufficient to move said switch means a distance in the direction of steer sufficient to compensate for an increment of the change in direction called for by said guide line.

14. A material handling device in accordance with claim 12 in which:

said elongated member is forward of said wheel means on the outboard side, and said radial means extend forward and rearward of said wheel means and from the same pivot point substantially the same distance.

15. A material handling device in accordance with claim 12 in which:

said link members are a cable, and said pivot point is a pulley positioned outboard of the inner end of said elongated member.

16. In a material handling machine in which the grade, slope and direction of a working tool are maintained in relation to a ground-supported guide line extending along a path to be traversed by said machine, the combination of:

a frame member;

a working tool carried by said frame member for ground engagement;

a pair of extensible members disposed in spaced substantially vertical relationship from one side of said frame member front and rear of said machine;

the extensible members carrying respectively, front and rear pivotally mounted ground engaging wheel means;

a single extensible member disposed substantially vertically and centrally of the other side of said frame member;

a walking beam pivotally disposed from said single extensible member and extending along said other side of said frame member;

a pair of pivotally mounted front and rear ground engaging wheel means disposed from and spaced on each side of the center of said walking beam;

means to individually drive each of said wheel means;

means to steer the front wheel means on their respective pivot mounts in unison and means to steer the wheel means on their respective pivot mounts in unison;

actuating means operatively connected to said pair of extensible members adapted for operative engagement with said guide line at points substantially opposite said extensible members to maintain grade level of said machine;

actuating means operatively connected to said single extensible member to control the transverse slope of said machine relative to said path; and actuating means operatively and independently connected to said front and rear steering means and adapted for operative engagement with said guide line at respective points therealong substantially opposite the ground engagement of each of said wheel means.

17. A material handling machine in accordance with claim 16 including:
means following and sensitive to the direction of said guide line and
means to move said following means in relation to said frame member in the same direction and a linear increment of steering correction.

18. A material handling machine in accordance with claim 17 including:
means to mount said following means for reciprocation on an axis perpendicular to the axis of said guide line; and
means connecting said mounting means to a point radially forward and radially rearward of the pivot point of said wheel means whereby the steering of said wheel means moves said following means in either direction of steer a linear incremental amount of a steering correction.

19. A material handling machine in accordance with claim 18 in which:
said wheel means comprise pivotally mounted crawler tractors;
said means connecting said mounting means are attached to radial members extending fore and aft of the pivot of said crawler tractors; and
said radial members are of a length sufficient to move said following means an amount less than a steering connection.

20. A material handling machine in accordance with claim 18 in which:
said radial members extend a distance no greater than the length of said crawler tractors along their longitudinal axes.

References Cited
UNITED STATES PATENTS

| | | | |
|---|---|---|---|
| 2,864,452 | 12/1958 | Guntert | 94—46X |
| 3,155,020 | 11/1964 | Gurries | 94—46X |
| 3,249,026 | 5/1966 | Curlett | 94—46 |
| 3,257,917 | 6/1966 | Lewis | 94—46X |
| 3,363,524 | 1/1968 | Catenacci | 94—46 |

JACOB L. NACKENOFF, Primary Examiner

PO-1050
(5/69)

UNITED STATES PATENT OFFICE
CERTIFICATE OF CORRECTION

Patent No. 3,606,827      Dated September 21, 1971

Inventor(s)   CHARLES P. MILLER et al

It is certified that error appears in the above-identified patent and that said Letters Patent are hereby corrected as shown below:

Column 14, line 64, in claim 16, after "the" insert -- rear --

Signed and sealed this 24th day of October 1972.

(SEAL)
Attest:

EDWARD M. FLETCHER, JR.      ROBERT GOTTSCHALK
Attesting Officer      Commissioner of Patents